3,822,315
CYCLOALIPHATIC CROTONYL COMPOUNDS
Erich Klein, Holzminden, Germany, assignor to Dragoco Spezialfabrik Konz. Riech- und Aromastoffe Gerberding & Co. GmbH, Holzminden, Germany
No Drawing. Filed May 24, 1971, Ser. No. 146,554
Claims priority, application Germany, Apr. 26, 1971,
P 21 20 413.7
Int. Cl. C07c 49/48
U.S. Cl. 260—586 R  4 Claims

ABSTRACT OF THE DISCLOSURE

The invention provides new cycloaliphatic crotonyl compounds of the type of trans-2,4,4-trimethyl-1-crotonyl-cyclohex-2-ene wherein the 3-position of the cyclohexene may contain a hydrogen or a lower alkyl. The invention provides a production of these compounds, and the use of these compounds as odoriferous agents for perfumes and other industries.

BACKGROUND OF THE INVENTION

The invention relates generally to 3-hydrogen or lower alkyl - 2,4,4 - trimethyl-1-crotonyl-cyclohex-2-ene compounds which have been found to be highly effective in enriching odors of natural perfumes and of artificial aromas. The art is always seeking new substances which can be used for this purpose.

SUMMARY OF THE INVENTION

Generally speaking, in accordance with the invention there is provided new compounds of the type of 3-hydrogen or lower alkyl-2,4,4-trimethyl-1-crotonyl-cyclohex-2-ene compounds and the method of producing the same by reaction of the corresponding trimethylcyclohex-1-ene with crotonic anhydride, as well as the use of the new compounds of the invention as odoriferous agents, for example, as additives to perfumes and the like.

It is accordingly a primary object of the present invention to provide the above described new compounds.

It is a further object of the present invention to provide a method of producing the compounds.

It is yet a further object of the invention to provide the use of these compounds in the perfume and aroma industries and for related purposes.

Other objects and advantages of the present invention will be apparent from a further reading of the specification and of the appended claims.

With the above and other objects in view, the present invention mainly comprises a new compound, which is an unsaturated ketone, of the formula:

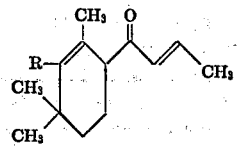

wherein R may be hydrogen or lower alkyl, preferably $CH_3$ or $C_2H_5$.

The following are the three preferred compounds of the invention:

trans - 2,4,4-trimethyl-1-crotonyl-cyclohex-2-ene, i.e. the above compound wherein R=H;
trans - 2,3,4,4-tetramethyl-1-crotonyl-cyclohex-2-ene, i.e. R=$CH_3$; and
trans-2,4,4-trimethyl-3-ethyl-1-crotonyl-cyclohex-2-ene, i.e. R=$C_2H_5$.

It has been found that the new compounds of Formula I above, are particularly useful in the production of perfumes and artificial aromas. Thus, by the addition of one of these new crotonyl compounds to flower perfumes, a surprisingly natural odor impression is achieved and the odor intensity is considerably increased.

In the production of artificial aromas, the new compounds of the invention develop very natural fruit-like and increased wine-like and fresh flower-like nuances. The amounts in which the new crotonyl compounds can be used depends upon the desired effect and can be varied within very wide limits. Thus, for example, in the perfume field amounts of 0.03–10% can be used, whereas in the field of artificial aromas amounts of between about 0.5 and 15% are suitable. Each expert is in a position, depending upon the desired effect, to select a concentration for his purposes.

The production of the new crotonyl compounds of Formula I can be carried out by reacting an unsaturated cyclic hydrocarbon of the formula:

(II)
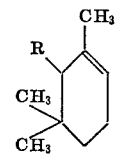

wherein R has the same definition as above, in the presence of a Lewis acid, such as $BF_3$, $SnCl_4$ or $ZnCl_2$ with crotonic anhydride (crotonic acid anhydride). An acylation of the unsaturated hydrocarbon of Formula II proceeds with displacement of the double bond in the cyclohexene ring to directly produce the crotonyl compound of Formula I above. The surprisingly uniform course of the reaction in a single stage proceeds without a solvent at temperatures between about 0° C. and 60° C., most preferably at a temperature of about 20° C.

The compounds which are used as starting substances for the method of the present invention are known compounds which are commercially available or are agents which are known in the literature and can be easily produced according to known methods. The new compounds of the invention enrich in a most valuable manner the choice of additives for perfumes and artificial aromas.

DESCRIPTION OF PREFERRED EMBODIMENTS

The invention is further illustrated below by the examples which follow. The scope of the invention is not, however, meant to be limited to the specific details of the examples.

EXAMPLE 1

Production of trans-2,4,4-trimethyl-1-crotonyl-cyclohex-2-ene 62 g. of 1,5,5-trimethylcyclohex-1-ene are added dropwise under stirring at a temperature of 20° C. to a mixture of 77 g. of crotonic anhydride and 10 g. of zinc chloride. After the end of the addition the reaction mixture is stirred for 8 hours at 20° C. Excess crotonic anhydride is then decomposed by the addition of hot water and the aqueous mixture is extracted with petroleum ether. The extract is first washed with water and subsequently with 10% sodium carbonate solution until neutral. The solvent is removed by distillation under vacuum and the product is subjected to fractional vacuum distillation. There is thus obtained in this manner 41 g. (74% of the theoretical calculated with respect to the unsaturated hydrocarbon) of trans-2,4,4-trimethyl-1-crotonyl-cyclohex-2-ene; b.p. 86° C./1 torr, $d_4^{20}$: 0.9247, $n_D^{20}$: 1.4902.

EXAMPLE 2

Production of trans-2,3,4,4-tetramethyl-1-crotonyl-cyclohex-2-ene 69 g. of 1,5,5,6-tetramethylcyclohex-1-ene are added dropwise under stirring at 10° C. to a mixture of 77 g. of crotonic anhydride and 10 g. of tin tetrachloride. The reaction mixture is then stirred for an additional 12 hours and the excess acid anhydride is decomposed with hot water, after which the reaction mixture is subjected to extraction with petroleum ether and working up of the extract as in Example 1 to a crude product which, after fractional distillation yields 35.5 g. (57.5% of the theoretical calculated with respect to the unsaturated hydrocarbon) of trans-2,3,4,4-tetramethyl-1-crotonyl-cyclohex-2-ene; b.p. 103° C./1 torr, $d_4^{20}$: 0.9296, $n_D^{20}$: 1.4957.

EXAMPLE 3

Production of trans-2,4,4-trimethyl-3-ethyl-1-crotonyl-cyclohex-2-ene 76 g. of 1,5,5-trimethyl - 6 - ethyl-cyclohex-1-ene are added dropwise under stirring to a mixture of 77 g. of crotonic anhydride and 14 g. of $BF_3$-etherate, which is then stirred for an additional 10 hours at 35° C. There is obtained after extraction with petroleum ether a crude product which after fractional distillation under vacuum amounts to 40.5 g. (60% of the theoretical calculated with respect to the unsaturated hydrocarbon) of the above compound; b.p. 112° C./1 torr, $d_4^{20}$: 0.9324, $n_D^{20}$: 1.4992.

EXAMPLE 4

Production of artificial fruit aroma

An artificial fruit aroma is produced of the following components:

| Component: | Parts by weight |
|---|---|
| Levulinic acid ethyl ester | 125 |
| Butyric acid ethyl ester | 70 |
| Capronic acid ethyl ester | 20 |
| Cinnamic acid ethyl ester | 20 |
| Capronic acid benzyl ester | 20 |
| Isobutyric acid benzyl ester | 20 |
| Butyric acid benzyl ester | 20 |
| 2-Hexenal | 10 |
| Oxymethylfurfural | 15 |
| Capronic acid | 20 |
| Valeric acid | 2.5 |
| Butyric acid | 2.5 |
| Lactic acid | 300 |
| Maltol | 30 |
| Benzyl alcohol | 300 |
| | 975.0 |

25 g. of trans-2,4,4 - trimethyl-1-crotonyl-cyclohex-2-ene are added to 975 g. of the above mixture. Odor tests carried out on this artificial fruit aroma showed that the addition of the trans-2,4,4-trimethyl-1-crotonyl-cyclohex-2-ene effects a strengthening and changing of the aroma in the direction of natural fruit aroma.

EXAMPLE 5

Production of a flower scented odoriferous composition

A flower scented odoriferous composition is produced by mixing of the following components:

| Component: | Parts by weight |
|---|---|
| Hydroxycitronellal | 370 |
| Benzylacetate | 170 |
| alpha-Amylcinnamaldehyde | 100 |
| gamma-Methylionone | 75 |
| Phenylethylalcohol | 40 |
| Trichloromethylphenylcarbinylacetate | 35 |
| Methylnaphthylketone | 30 |
| Ylang-ylang oil extra | 25 |
| Phenylacetaldehyde, 50% solution in phthalic acid diethylester | 20 |
| Heliotropin | 20 |
| East Indian sandalwood oil | 20 |
| Vetiveryl acetate | 20 |
| Isoeugenol | 15 |
| Indole | 5 |
| gamma-Undecalactone | 5 |
| | 950 |

By the addition of 50 g. of trans-2,4,4-trimethyl-1-crotonyl-cyclohex-2-ene or 50 g. of trans-2,3,4,4-tetramethyl-1-crotonyl-cyclohex-2-ene or 50 g. of trans-2,4,4-trimethyl-3-ethyl - 1 - crotonyl-cyclohex-2-ene to 950 g. of the above flowery odoriferous composition, a considerable strengthening of the diffusion is obtained. The resulting odoriferous composition moreover achieves a characteristic natural body.

While the invention has been described with respect to particular compounds and compositions, it is apparent that variations and modifications of the invention can be made.

What is claimed is:

1. The trans-isomer of a compound of the formula:

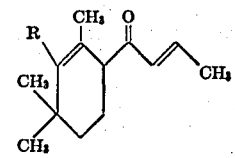

wherein R is selected from the group consisting of hydrogen and lower alkyl.

2. Compound according to claim 1 wherein said compound is trans-2,4,4-trimethyl-1-crotonyl-cyclohex-2-ene.

3. Compound according to claim 1 wherein said compound is trans-2,3,4,4-tetramethyl-1-crotonyl-cyclohex-2-ene.

4. Compound according to claim 1 wherein said compound is trans-2,4,4-trimethyl-3-ethyl-1-crotonyl-cyclohex-2-ene.

References Cited

UNITED STATES PATENTS

| | | | |
|---|---|---|---|
| 3,019,263 | 1/1962 | Eshinazi | 260—586 R |
| 2,801,266 | 7/1957 | Schinz | 260—587 |
| 2,636,052 | 4/1953 | Grutter | 260—587 |
| 3,530,171 | 9/1970 | Heckert | 260—587 |

LEON ZITVER, Primary Examiner

N. MORGENSTERN, Assistant Examiner

U.S. Cl. X.R.

252—522